(12) United States Patent  (10) Patent No.: US 8,008,911 B2
Melinat et al.  (45) Date of Patent: Aug. 30, 2011

(54) METHOD AND DEVICE FOR THE DETERMINATION OF THE ROAD CLEARANCE OF A VEHICLE

(75) Inventors: Norbert Melinat, Waiblingen (DE); Ralf Bauer, Neckarsulm (DE); Thorsten Leschinski, Ludwigsburg (DE); Harald Schöffler, Obersulm-Eschenau (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 544 days.

(21) Appl. No.: 12/133,017

(22) Filed: Jun. 4, 2008

(65) Prior Publication Data
US 2008/0309325 A1 Dec. 18, 2008

(30) Foreign Application Priority Data
Jun. 13, 2007 (DE) .......... 10 2007 027 253

(51) Int. Cl.
*G01B 7/14* (2006.01)
*G01B 7/30* (2006.01)
(52) U.S. Cl. ......... 324/207.26; 324/207.11; 324/207.13; 324/207.21; 73/127; 280/735
(58) Field of Classification Search . 324/207.11–207.26
See application file for complete search history.

(56) References Cited

U.S. PATENT DOCUMENTS

| 4,555,120 A | * | 11/1985 | Frait et al. ................. | 280/6.158 |
| 4,898,027 A | | 2/1990 | Morra | |
| 5,880,586 A | * | 3/1999 | Dukart et al. .............. | 324/207.2 |
| 5,922,953 A | * | 7/1999 | Payne et al. ................ | 73/494 |

FOREIGN PATENT DOCUMENTS

| DE | 26 42 228 A1 | 3/1978 |
| DE | 35 38 349 A1 | 7/1986 |
| DE | 102 55 438 A1 | 6/2004 |
| DE | 10 2004 049 753 B3 | 4/2006 |

* cited by examiner

*Primary Examiner* — Vinh P Nguyen
*Assistant Examiner* — Emily Y Chan

(57) ABSTRACT

In a method for determining road clearance of a vehicle, the vehicle is moved relative to a measurement configuration with a reference surface. One or more magnets, which are disposed on the vehicle and assigned preferably each to a defined measurement point on the vehicle, is detected by at least one device for magnetic field measurement. With the help of at least one device for separation measurement, the separation between the measurement configuration and the bottom side of the vehicle is determined. In this way, a rapid, reliable, repeatable and flexibly usable method for the determination of the road clearance of a vehicle is provided. A corresponding device is provided for implementing the method.

8 Claims, 4 Drawing Sheets

METHOD AND DEVICE FOR THE DETERMINATION OF THE ROAD CLEARANCE OF A VEHICLE

CROSS-REFERENCE TO RELATED APPLICATION

This application claims the priority, under 35 U.S.C. §119, of German application DE 10 2007 027 253.9, filed Jun. 13, 2007; the prior application is herewith incorporated by reference in its entirety.

BACKGROUND OF THE INVENTION

Field of the Invention

The invention relates to a method for determining road clearance of a vehicle, where the vehicle is moved relative to a measurement configuration. The invention also relates to a corresponding device.

It is known to measure the road clearance of vehicles, particularly of trucks, with the help of lathes or gauges. This may be necessary, for example, for safety reasons. In sport racing events, a minimum height is often prescribed for the road clearance of the participating sport racing vehicles. In the measurement of a road clearance with lathes, a vehicle is moved over a lathe having the prescribed minimum height. If the lathe falls over, then at least some parts of the vehicle bottom are lower than the prescribed minimum height. If the lathe remains standing, then the minimum road clearance is considered to have been met. The road clearance can also be determined by moving gauges on a reference surface beneath the vehicle bottom. If the gauges can be moved appropriately freely, then the minimum road clearance is considered to have been complied with.

These known methods for verifying the road clearance of a vehicle are time consuming, imprecise, and they require a large expenditure of testing personnel.

BRIEF SUMMARY OF THE INVENTION

It is accordingly an object of the invention to provide a method and a device for the determination of the road clearance of a vehicle which overcome the above-mentioned disadvantages of the prior art methods and devices of this general type, which allow a more rapid, simpler, and more precise determination of the road clearance of vehicles.

With the foregoing and other objects in view there is provided, in accordance with the invention, a method for determining road clearance of a vehicle. The method includes the steps of moving the vehicle relative to a measurement configuration, detecting at least one magnet disposed on the vehicle with at least one device for magnetic field measurement, and providing at least one device for separation measurement for determining a separation between the measurement configuration and a bottom side of the vehicle.

In the method of the type mentioned in the introduction, one or more magnets, which are disposed according to the invention on a vehicle, are detected by at least one device for measuring magnetic fields, and the separation between the measurement configuration and the bottom side of the vehicle is determined with the assistance of at least one device for measuring separation. In this way, a rapid, reliable, repeatable and flexibly usable method is provided for the determination of the road clearance of a vehicle.

An appropriate device for the determination of the road clearance of a vehicle has a measurement configuration where the vehicle can be moved relative to the measurement configuration. The measurement configuration has one or more devices for magnetic field measurement and one or more devices for measuring separation. The device for magnetic field measurement has one or more magnetic field sensors, and the device for measuring separation has one or more separation sensors configured for contact-free separation measurement.

The invention can considerably reduce the time required for the determination of the road clearance of a vehicle. Moreover, the testing personnel no longer need to perform physical work. The determination of the road clearance becomes moreover much more flexible. The determination of the road clearance according to the invention can also be carried out reliably and reproducibly for different vehicle types and under different general conditions.

Advantageously, one or more magnets, which may be configured, for example, as permanent magnets, can be assigned in each case to a defined measurement point on the vehicle to be checked. Here, it is advantageous to determine the separation between the measurement configuration and the bottom side of the vehicle at the defined measurement points.

The measurement process(es) of the at least one device for separation measurement can be controlled advantageously in dependence on the measurement values determined with the help of the at least one device for magnetic field determination.

The measurement configuration used for the determination of the road clearance can be constructed advantageously so it can be driven over.

Advantageously, in each case a device for magnetic field measurement and a device for separation measurement are associated with each other.

In an advantageous variant of the invention, the at least one device for magnetic field measurement can have several magnetic field sensors that are arranged in a row.

Advantageously, the at least one device for separation measurement can have several separation sensors that are arranged in a row and parallel to the magnetic field sensors.

Advantageously, the at least one device for separation measurement can have at least one separation sensor that can be shifted parallel to the magnetic field sensors.

Advantageously, one or more, or optionally all of the, separation sensors can be configured as optical sensors.

Advantageously, one or more or optionally all of the separation sensors can be constructed as ultrasound sensors.

Advantageously, the one or more devices for magnetic field measurement and the one or more devices for separation measurement can be coupled with a control device.

Other features which are considered as characteristic for the invention are set forth in the appended claims.

Although the invention is illustrated and described herein as embodied in a method and a device for the determination of the road clearance of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
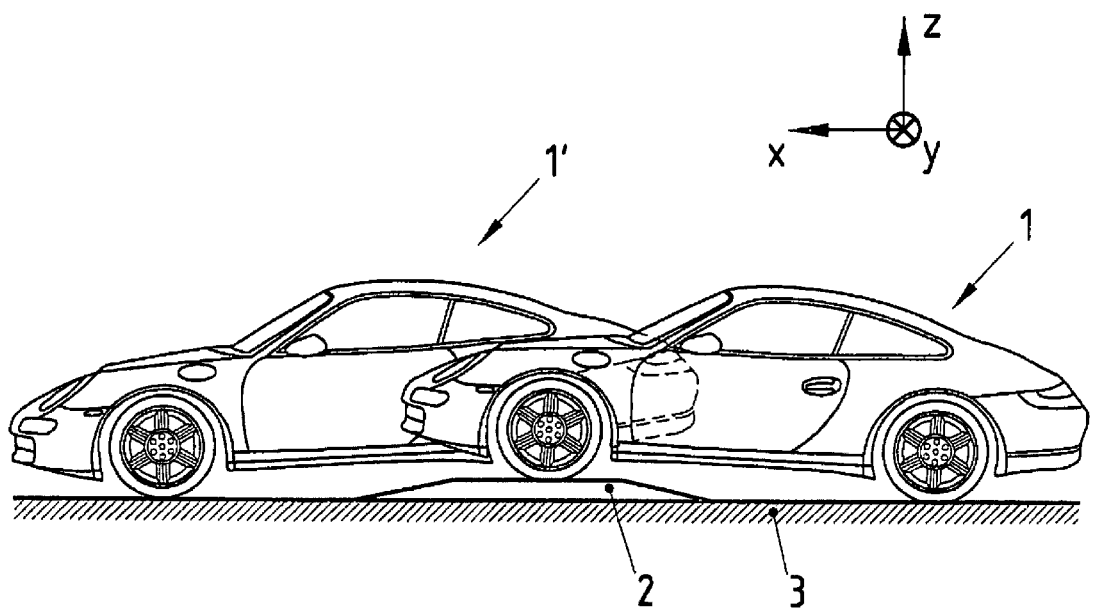
FIG. 1 is a diagrammatic, side-elevational view of a vehicle and a measurement configuration.

Referring now to the figures of the drawing in detail and first, particularly, to FIG. 1 thereof, there is shown a vehicle 1, 1' moved over a measurement configuration 2. An upper side of the measurement configuration 2 forms a reference plane that is located above a bottom 3. The reference plane extends in a longitudinal direction x and in a transverse direction y. As a measure of the road clearance of the vehicle 1, 1', the separation h (see FIG. 4) can be used, which is measured preferably in the height direction z. By moving the vehicle 1, 1' during the measurement over the reference plane and over the measurement configuration 2, the road clearance can be determined more rapidly and in a continuous measuring process.

Figure 2:
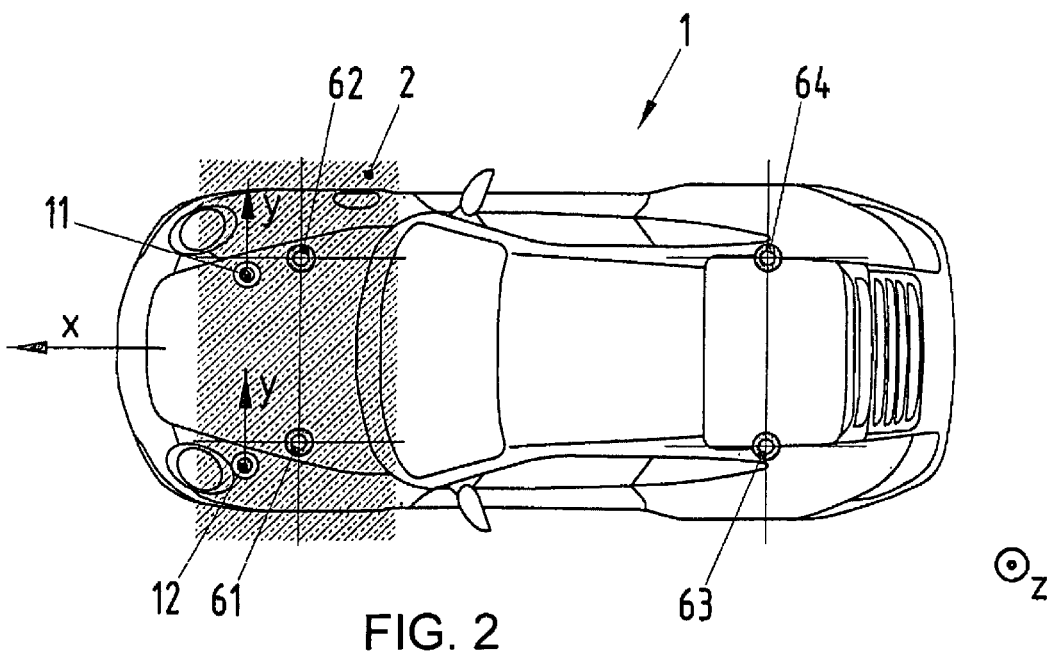
FIG. 2 is a top, plan view of the vehicle and the measurement configuration.

FIG. 2 shows the vehicle 1 seen from above, where the measurement configuration 2 is indicated schematically. In the example shown, the vehicle 1 presents four measurement points, on which magnets 61, 62, 63, 64 are disposed. The magnets 61, 62, 63, 64 can be arranged, for example, at the measurement points or, for example, at a defined separation in the longitudinal direction x in front of the measurement points on the vehicle 1. In the measurement configuration shown, there is one degree of freedom for the measurement by the movement of the vehicle 1 over the measurement configuration 2 or over the reference plane. Measurement devices 11, 12 used are only indicated in FIG. 2. An additional degree of freedom can be achieved by moving the measurement devices 11, 12, for example, by swiveling and/or by a translational movement of the measurement devices 11, 12. To provide an additional degree of freedom during the measurement, the measurement devices 11, 12 can alternatively or additionally also present several elements in each case.

The magnets 61, 62, 63, 64 can be configured as permanent magnets and they generate advantageously as strong as possible a stray field. For example, sintered magnets, for example, neodymium magnets, can be used. Because high temperatures can occur due to the operation of the vehicle 1, it can be advantageous to use samarium-cobalt magnets. In an alternative embodiment, the magnets 61, 62, 63 64, can be configured as electromagnets. Even if electromagnets are used to generate the magnetic field, it is preferred to generate as strong as possible a stray field. The magnets 61, 62, 63, 64 can be attached to the vehicle 1, particularly to the measurement points, by screw connection or by gluing. The magnets can also adhere by magnetic interaction to the vehicle 1. It is preferred for the orientation of the magnetic field to be dependent on magnetic field sensors 41, 42, 43 used (see FIG. 3, among others) or dependent on a device 40 used for magnetic field measurement. It is advantageous for the magnetic axis of the magnets to extend parallel to the longitudinal direction x.

Figure 3:
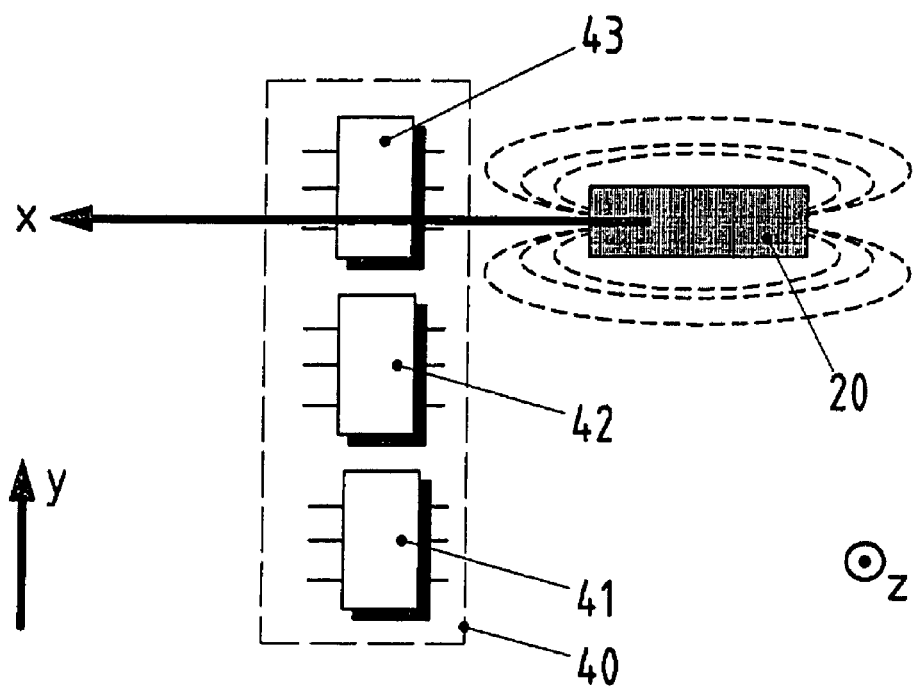
FIG. 3 is an illustration of a device for magnetic field measurement.

FIG. 3 shows the device 40 for magnetic field measurement, where the device 40 for magnetic field measurement presents several sensors 41, 42, 43 for the detection of magnetic fields. The magnetic field sensors 41, 42, 43 detect changes in magnetic fields by exploiting the magnetoresistive effect. The magnetic field surrounding a magnet 20 is indicated in the drawing. The magnetic field sensors 41, 42, 43 of the device 40 for magnetic field measurement are arranged parallel to the transverse direction y, in the example shown. If the magnet 20 is moved over such a device 40 for magnetic field measurement, then the starting voltages of the magnetic field sensors 41, 42, 43 behave proportionally to the field strength, and thus indirectly proportionally to the separation of the magnetic field sensors 41, 42, 43 from the magnets 20. The highest voltage level is generated here by the magnetic field sensors that are closest to the magnet. Thus, it is possible, via the measurement of the starting voltages of the magnetic field sensors 41, 42, 43 and on the basis of the known position of the individual magnetic field sensors 41, 42, 43, to determine at least the position of the magnets 20 along the transverse direction.

Figure 4:
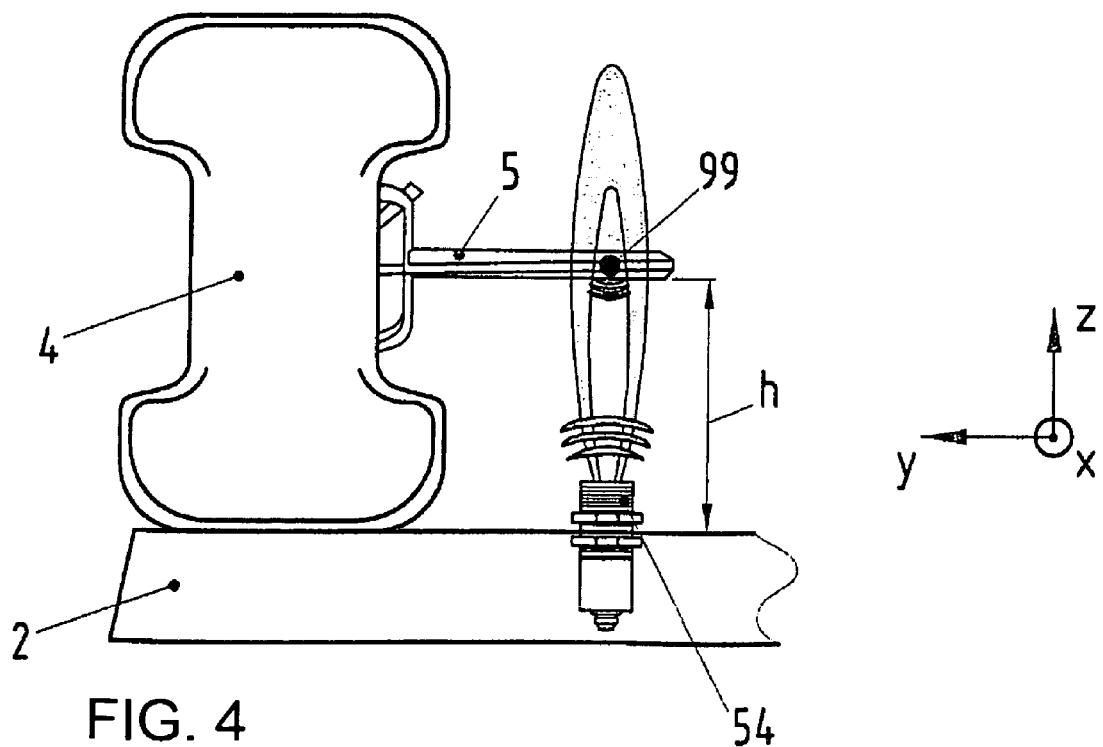
FIG. 4 is an illustration of a separation sensor.

FIG. 4 shows, for example, a separation sensor 54 of the measurement configuration 2. With the help of such separation sensors, the separation h between measurement points 99 on the vehicle and the reference surface or the surface of the measurement configuration 2 can be determined. In the example shown, a measurement point 99 is arranged in an area 5 of the vehicle. The measurement point 99 can also be arranged at other defined points of the undercarriage of a vehicle. In FIG. 4, a wheel 4 of the vehicle is also indicated.

Figure 5:
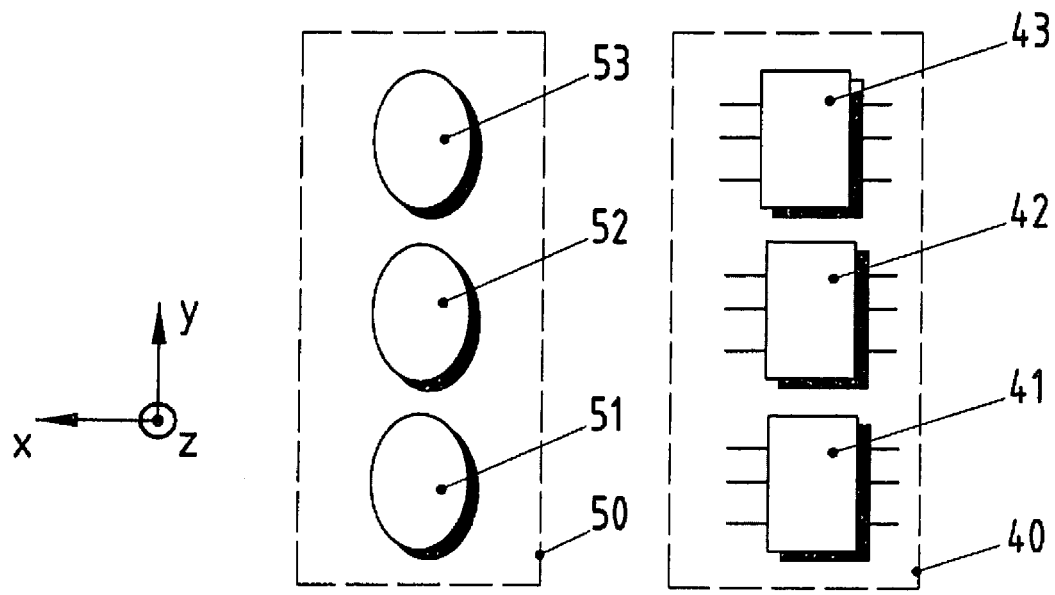
FIG. 5 is an illustration of the device for magnetic field measurement and the device for separation measurement.

As represented in FIG. 5, separation sensors 51, 52, 53 of a device 50 for separation measurement can be disposed parallel to the magnetic field sensors 41, 42, 43 of a device 40 for magnetic field measurement.

Figure 6:
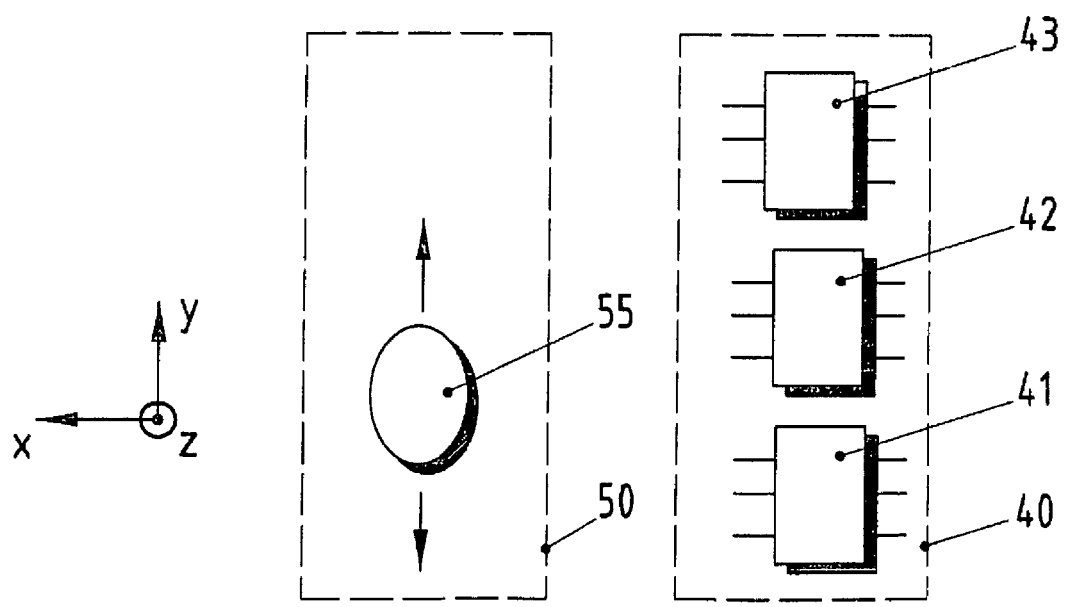
FIG. 6 is an illustration of the device for magnetic field measurement and the device for separation measurement with a movable separation sensor.

As indicated in FIG. 6, the number of separation sensors used can be reduced, if at least one separation sensor 55 is configured so it can be shifted parallel to the magnetic field sensors 41, 42, 43.

The measurement of the separation h (see FIG. 4) or of the road clearance can be carried out using a triangulation method. For this purpose, a light beam is emitted, and the reflection of this light beam at the measurement point via a mirror configuration is measured with an optical sensor. The measured angle of the projection of the reflected light point on the measurement point is proportional to the separation of the measurement point. The configuration of the optical sensors is carried out preferably in the immediate vicinity of and preferably parallel to the magnetic field sensors (see FIG. 5). One or more optical sensors can be mounted firmly on the reference plane of the measurement configuration 2 or movably, for example, on a sliding carriage.

Alternatively or additionally, the measurement of the separation h (see FIG. 4) can occur with the help of one or more ultrasound sensors. Here, an ultrasound pulse is emitted and the echo reflected by the measurement point is received. The travel time of the echo signal is proportional to the separation of the measurement point. The configuration or mounting of the ultrasound sensors can occur in a way that is similar to the configuration or mounting of the optical sensors, for example, as represented schematically in FIGS. 5 and 6.

Figure 7:
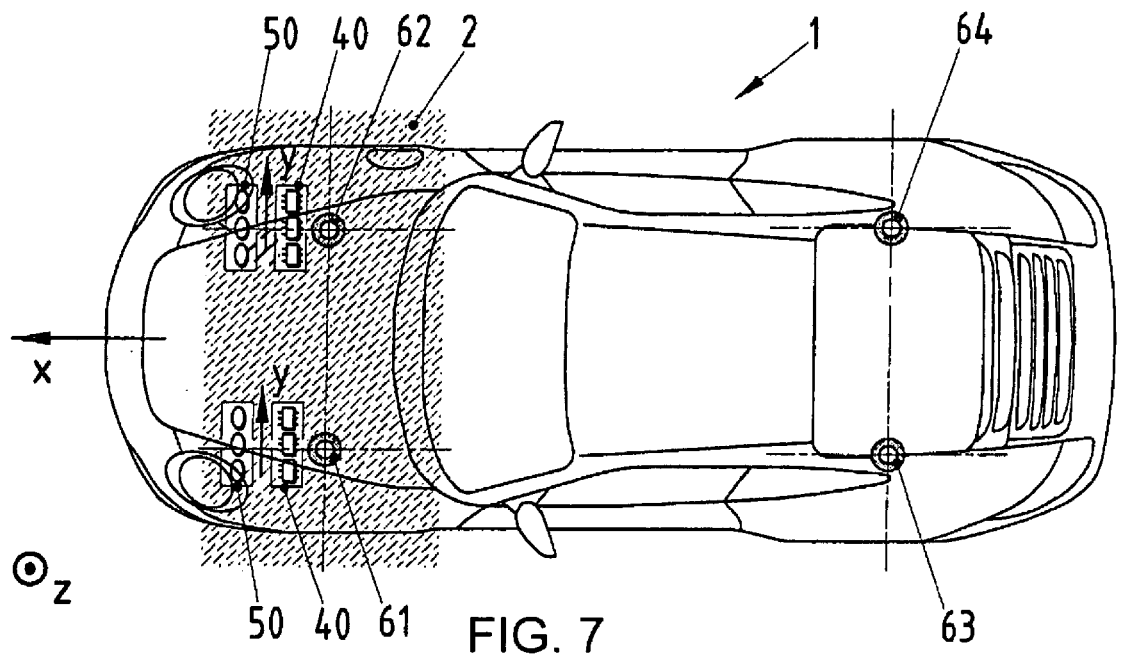
FIG. 7 is a diagrammatic, top plan view of the vehicle and the measurement configuration.

Below, an example of a measurement process is described with reference to FIG. 7. First, the vehicle 1 is aligned and then it is moved, preferably with the front axle first, over the reference plane of the measurement configuration 2 at as regular a speed as possible. In the process, the measurement points and the magnets 61, 62, 63, 64 associated with them are moved over the sensor fields, i.e., over the devices 40 for magnetic field measurement and over the devices 50 for separation measurement. It is preferred to arrange two measurement points in the area of the front axle and two measurement points in the area of the rear axle. The voltages of the magnetic field sensors are measured, readout and stored after being provided with time data. The storage is preferably only brief. When the measurement points marked with the help of the magnets 61, 62, 63, 64 are brought closer to the device 40 for magnetic field measurement, the voltages of the magnetic field sensors located in the vicinity change. Starting from a preset threshold value, the separation measurement is activated. From the activation time on, the measured separation values are stored and recorded, preferably after having been provided with time data. If the measured voltages of the magnetic field sensors fall below a predetermined threshold value, the separation measurement is terminated. It is preferred to evaluate the data after the end of the measurement, where the location and the height of the measurement points 99 arranged on the vehicle (see FIG. 4) are determined.

Figure 8:
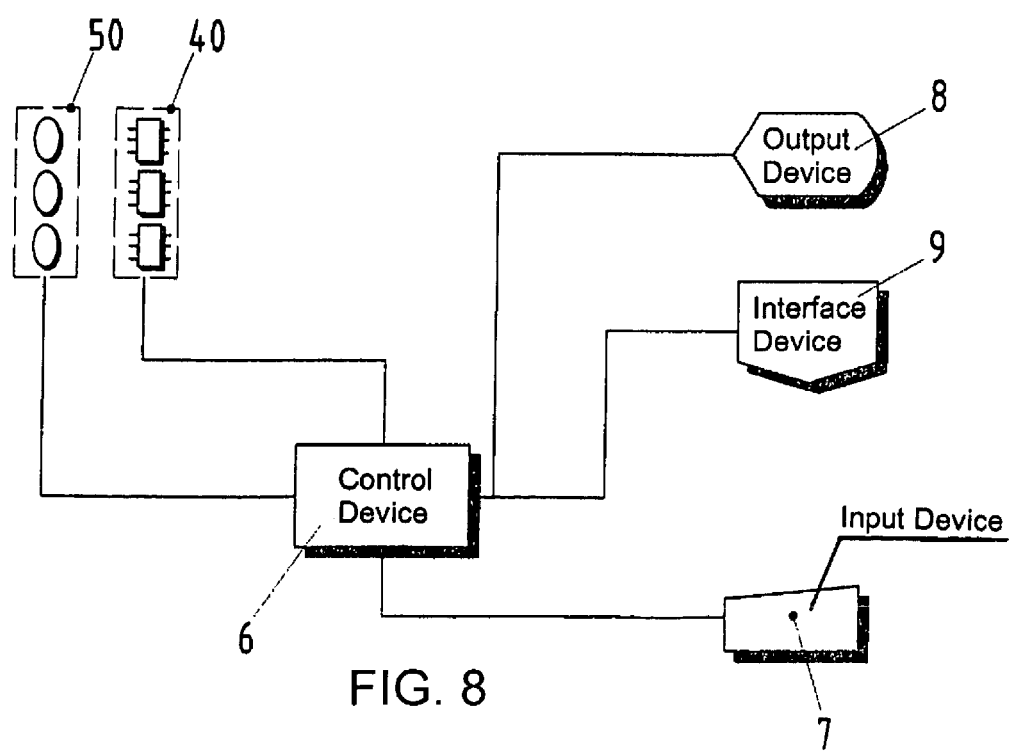
FIG. 8 is an illustration of a coupling of the measurement configuration with a control device.

As represented in FIG. 8, the devices 40 for magnetic field measurement and the devices 50 for separation measurement are coupled with a control device 6, where measurement data of the sensors are delivered to the control device 6. The activation of the separation sensors is carried out by the control device 6 as a function of the data produced by the magnetic field sensors. The control device 6 presents preferably an evaluation unit and a storage unit for the sensor data. The control device 6 can be coupled to an input device 7, by which the type of the vehicle to be measured, for example, can be entered. Control commands can also be entered via the input device 7. The control device 7 is preferably coupled with an output device 8, with the help of which measurement values and/or status information, for example, can be displayed. The control device 6 can be coupled with an interface device 9, where the input and output of data can be carried out with the help of this interface device 9.

The invention claimed is:

1. A device, comprising:
a measurement configuration having at least one device for magnetic field measurement and at least one device for separation measurement, said device for magnetic field measurement having at least one magnetic field sensor, said device for separation measurement having at least one separation sensor configured for contact-free separation measurement, and a control device coupled to said at least one device for magnetic field measurement and to said at least one device for separation measurement, and a measurement process of said at least one device for separation measurement is controlled by said control device in dependence on measurement values determined by said at least one device for magnetic field measurement.

2. The device according to claim 1, wherein said measurement configuration is configured to be driven over.

3. The device according to claim 1, wherein said device for magnetic field measurement is assigned to said device for separation measurement.

4. The device according to claim 1, wherein said magnetic field sensor of said at least one device for magnetic field measurement is one of a plurality of magnetic field sensors disposed in a row.

5. The device according to claim 4, wherein said separation sensor of said at least one device for separation measurement is one of a plurality of separation sensors disposed in a row and parallel to said magnetic field sensors.

6. The device according to claim 4, wherein said separation sensor of said at least one device for separation measurement can be shifted parallel to said magnetic field sensors.

7. The device according to claim 1, wherein said separation sensor is one of a plurality of optical sensors.

8. The device according to claim 1, wherein said separation sensor is one of a plurality of ultrasound sensors.

* * * * *